June 13, 1950 C. G. PEARSON 2,511,175
BOARD REMOVING TOOL
Filed Sept. 27, 1946 2 Sheets-Sheet 1

*INVENTOR.*
*Carl G. Pearson*
BY
*J. F. Chilon*
ATTY

June 13, 1950 C. G. PEARSON 2,511,175
BOARD REMOVING TOOL
Filed Sept. 27, 1946 2 Sheets-Sheet 2

INVENTOR.
Carl G. Pearson
BY

Patented June 13, 1950

2,511,175

UNITED STATES PATENT OFFICE 2,511,175

BOARD REMOVING TOOL

Carl G. Pearson, Philadelphia, Pa.

Application September 27, 1946, Serial No. 699,909

4 Claims. (Cl. 254—131)

This invention relates to devices used in razing wooden buildings or prefabricated structures and is particularly concerned with tools of this type which are adapted to remove intact whole boards which are nailed or otherwise removably secured to studding, joists, purlins, etc.

An object of the invention is in the provision of a tool which is designed to receive boards of various thicknesses and remove the same from studding, joists, etc. in such a manner that the board securing means, for example, nails are removed from the studding or other securements in the same general direction in which they were driven.

Another object is to provide a tool which is designed to control the movement of boards from their connecting studding, joists or other securements in a manner to insure that the boards are removed without splitting or otherwise doing damage thereto.

A particular object of the invention is in providing such a tool adapted particularly for removing boards secured together by tongue and groove connections.

Still another object is in the provision of a board removing tool which can be designed to remove one or a plurality of boards in one operation.

In general, the tool of the present invention comprises a U shaped or forked member having a top and bottom jaw between which is received a board or boards to be removed from connecting joists, studs and the like securements. The distance between the top and bottom jaws of the forked member is such that a board is readily received therebetween adapting one tool to receive boards, for example, of ¾" to 1¼" in thickness and consequently gives greater flexibility in using the tool. A gripping member is movably secured to the lower jaw of the forked member and is arranged to be urged upwardly in contact with the bottom or under surface of a board which is to be removed and provides with the upper jaw of the forked member an effective gripping action. Preferably the movable gripping member will have a serrated upper surface for contacting and gripping the board under surface and the means for urging the gripping member in contact with the board is so arranged that the under surface of the board adjacent the free edge is contacted first by the serrated surface of the gripping member and the board removed generally arcuately from its free edge away from the edge of the next adjacent board. The movable connection between the gripping member and the lower jaw of the forked member may be designed variously but for best results cooperating slots are provided to receive stud bolts and the angle of the slots is by preference toward the rear of the jaws of the forked member. The forked member upper and lower jaws are interconnected by a shank, and in order to effect movement of the gripping member a lever arm is pivoted to the forked member preferably adjacent its shank so as to provide a handle portion above the forked member and a fulcrum portion or end adjacent and beyond the shank. The fulcrum end of the lever is adapted in operation of the device to rest on the studding or other securements to which the boards are attached and by pulling the handle end of the lever will exert pressure on its fulcrum end and on the board supporting members sufficient to force the movable gripping member in contact with the under surface of the board or boards positioned between the upper and lower jaws of the forked member.

There are several details incorporated in the device which provide refinements in the practical utility of the invention. For example, it has been learned from experience in using the tool that positive means, such as a spring, is helpful in urging the gripping member toward the under surface of a board to be removed. It has also been determined that positive means may be provided for returning the gripping member to its inoperative or normal position. Also as the lever arm is pulled to effect a gripping action on a board positive means in the form of a spring connection between the lever arm and the forked member may be provided for conveniently returning the various cooperating elements of the device to their normal inoperative or open position.

For a more detailed understanding of the invention reference is had to the following detailed description taken in conjunction with the accompanying drawings in which.

Figure 1:
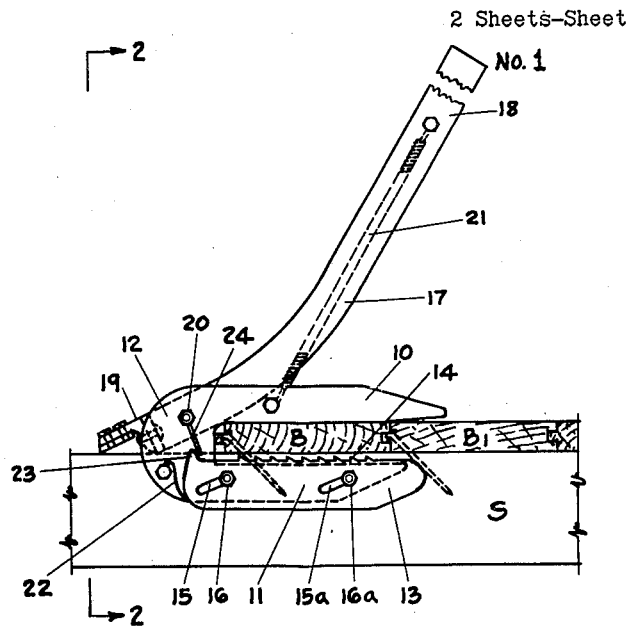
Fig. 1 is a side elevation of the device in position at the beginning of a board removing operation.

Referring now to Fig. 1, the U-shaped or forked member is formed of an upper jaw 10 and lower jaw 11 which is shown in dotted lines. The jaws 10 and 11 are interconnected by a rear shank portion 12 and as indicated in Fig. 1 a board or boards B is received between the jaws. It is to be noted particularly that the upper jaw is shown as slightly longer than the lower jaw and the purpose of this feature will be hereafter pointed out. Both the upper and lower jaws will be sufficiently long so that when a board is received therebetween the free ends of both of the jaws will extend beyond the edge of the next adjacent board and the space between the jaws is slightly greater than the board thickness in order that a board may be received readily therebetween.

A gripping plate 13 is secured to lower arm 11 and preferably is provided with a serrated upper edge 14 which upon upward movement of the plate will grip the under surface of board or boards B. The plate 13, as shown, is provided with a pair of angularly disposed slots 15 and 15a which receive stud bolts 16—16a to secure the plate 13 adjustably or movably on the lower jaw 11. In order to effect the upward movement of gripping plate 13 an actuating lever 17 having an upper handle portion 18 and a lower fulcrum or bearing portion 19 is provided. The actuating lever 17 is pivotally secured to the forked member by stud bolt 20 and is by preference curved as indicated in order that the fulcrum portion 19 will extend rearwardly of the shank 12 of the forked member and provide for greater leverage.

Figure 2:
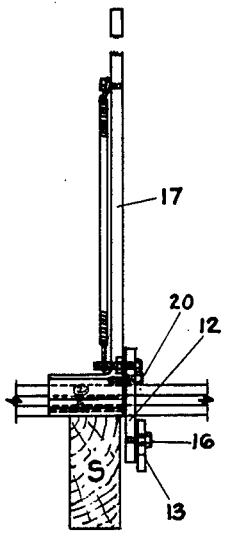
Fig. 2 is a sectional view taken on the line 2—2 of Fig. 1.

The fulcrum end of actuating lever 17 is preferably removably secured to the lever at its lower end in order to provide greater flexibility to the tool and the fulcrum end, as shown, in Fig. 2 is of substantial width so that it may contact the studding or other securement S across its entire upper surface and permit fulcrum ends of varying lengths to be used.

A spring 21 has one end secured to the actuating lever 17, preferably adjacent its handle portion 18 and its other end secured in the forked member preferably on its upper jaw 10 in order to return the actuating lever 17 to its normal or to the beginning of its board removing operation. A flat spring 22 which is secured to the shank 12 at one end and has its other end pressed in contact with gripping plate 13 is provided in order to normally urge the gripping plate 13 against the under surface of a board. When the tool is used in removing boards from a wall it is advantageous to provide a lug 23 on the shank 12 to cooperate with a pin or arm 24 in order to effect the return of the gripping plate 13 to its normal inoperative position.

Figure 3:
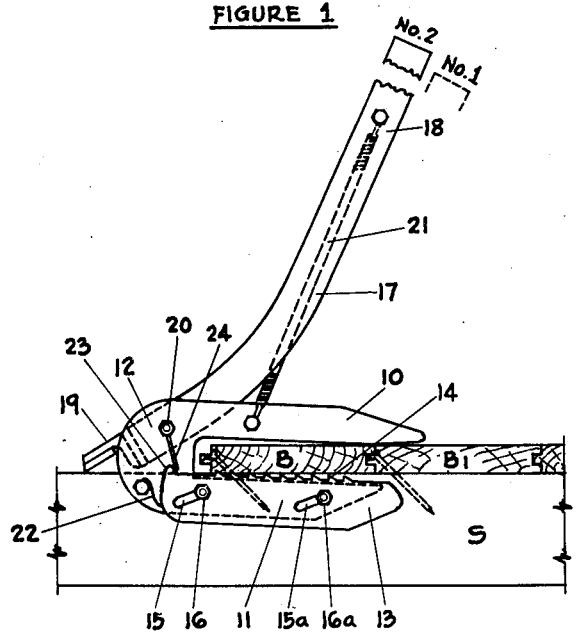
Figs. 3, 4 and 5 are views similar to Fig. 1 but showing the device in progressive stages of operation until a board is removed.
Figure 4:
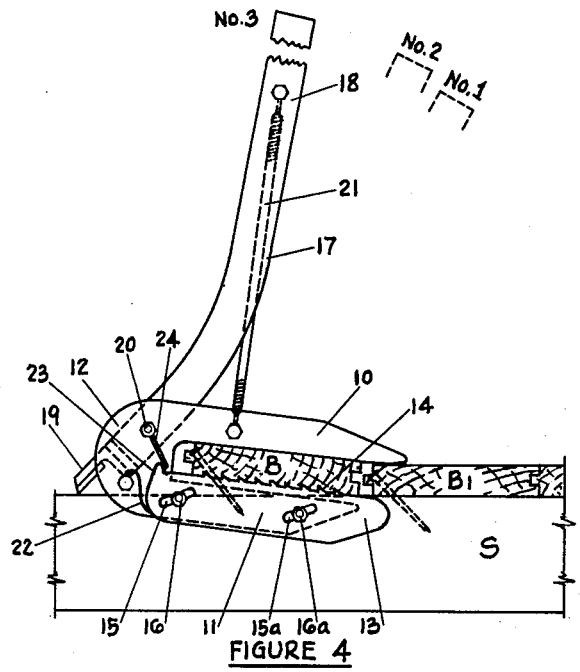
Figure 5:
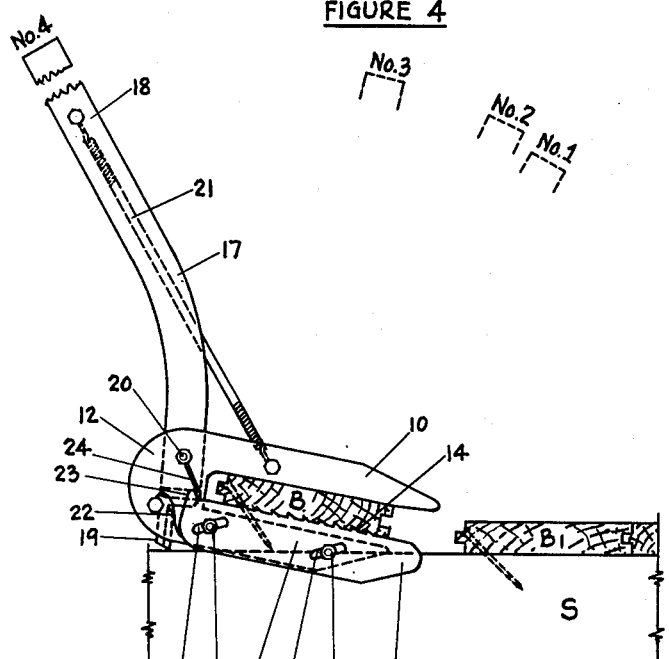

Referring to Figs. 1, 3, 4 and 5 which show the tool in different and progressive positions in removing a board. At Fig. 1 the lever 17 is shown in the No. 1 position with the board B received between the jaws of the forked member in loosely fitting relation therewith while the other parts of the tool are in their inoperative position. In Fig. 3 the lever 17 is pulled from position No. 1 to position No. 2 and some pressure is exerted on its fulcrum end or portion 19 causing the gripping plate 13 to be forced upwardly with the rear portion of its serrated surface first contacting the board adjacent its free edge and in effect tending to lift or raise the board at its free edge from the studding or other securement S while the toe of the upper jaw of the forked member effects a clamping action, by its downward pressure, on the joint with the next adjacent board B'. In Fig. 4 the gripping plate 13 has its serrated surface completely in contact with the under surface of the board B and the board's free edge is raised considerably above the level of the edge joined with the next adjacent board B' while the toe of upper jaw 10 is in relatively tight engagement with board B' holding it against the securement S and permitting board B to be removed generally arcuately from its free edge and away from its jointure with board B', thus in effect the board B is raised and simultaneously therewith it is pulled away from its jointure with board B'. In Fig. 5 the board B is shown completely removed from the securement S and any connections, for example nails, between the board B and the securement will have been removed generally from the direction in which they entered the studding or other securement. After the removal of board B, both from its connection with board B' and its securement S, the actuating handle 17 is returned to its No. 1 position and the board B released from the jaws of the forked member. If desired a stop pin may be provided on the upper jaw 10 to limit the return movement of lever 17.

From the foregoing description, it is believed that the construction and manner of use, as well as the advantages of the present invention will be readily understood and appreciated and by those skilled in art art. While I have illustrated and described a particular form or embodiment of the present invention, it will be apparent that modifications may be made therein such as fairly fall within the spirit and scope of the invention as claimed.

What I claim and desire to protect by Letters Patent is:

1. A tool for removing boards which are fixed to studding comprising a forked member having an upper and a lower jaw, said jaws being interconnected by a shank, a lever pivotally secured between its ends to said forked member providing an upper handle portion and a lower fulcrum portion, said fulcrum portion extending beyond the shank of the forked member to be received by a support to which boards are secured, said forked member being adapted to receive a board between its upper and lower jaws, a gripping plate having a plurality of slots therein, pins on the lower jaw extending through said slots and movably securing the gripping plate and lower jaw of the forked member together in general alignment, said slots being disposed at such an angle between the upper and lower edges of the gripping plate that the gripping plate moves toward the upper jaw of the forked member when the lever is pivoted on its fulcrum portion in order to grip the underside of a board being removed.

2. Claim 1 further characterized by a spring having one end secured to the handle portion of the lever and its other end secured to the forked member.

3. Claim 1 further characterized by said gripping plate having a serrated surface for gripping the underside of a board being removed.

4. Claim 1 further characterized by means on the forked member for returning the gripping plate to its inoperative position after a board has been removed.

CARL G. PEARSON.

REFERENCES CITED

The following references are of record in the file of this patent:

UNITED STATES PATENTS

| Number | Name | Date |
|---|---|---|
| 757,915 | Guenther | Apr. 19, 1904 |
| 1,311,029 | Wilkinson | July 24, 1919 |
| 1,389,183 | Burke | Aug. 30, 1921 |